(12) United States Patent
Snyder

(10) Patent No.: US 7,076,448 B1
(45) Date of Patent: Jul. 11, 2006

(54) AUTOMATED COMMUNICATION OF NEIGHBORHOOD PROPERTY VALUE INFORMATION FOR REAL ESTATE MARKETING

(75) Inventor: Steven L. Snyder, Sarasota, FL (US)

(73) Assignee: Lettuce Marketing, LLC, Sarasota, FL (US)

( * ) Notice: Subject to any disclaimer, the term of this patent is extended or adjusted under 35 U.S.C. 154(b) by 1012 days.

(21) Appl. No.: 09/660,118

(22) Filed: Sep. 12, 2000

(51) Int. Cl.
*G06F 17/60* (2006.01)

(52) U.S. Cl. ............................................ 705/26; 705/27
(58) Field of Classification Search .................. 705/26, 705/27; 707/100
See application file for complete search history.

(56) References Cited

U.S. PATENT DOCUMENTS

| | | | |
|---|---|---|---|
| 4,870,576 A | 9/1989 | Tornetta | |
| 5,032,989 A | 7/1991 | Tornetta | |
| 5,592,375 A | 1/1997 | Salmon et al. | |
| 5,636,117 A | 6/1997 | Rothstein | |
| 5,680,305 A | 10/1997 | Apgar, IV | |
| 5,909,670 A | 6/1999 | Trader et al. | |
| 6,058,369 A | 5/2000 | Rothstein | |
| 6,236,977 B1 * | 5/2001 | Verba et al. | 705/10 |
| 6,253,208 B1 * | 6/2001 | Wittgreffe et al. | 705/14 |
| 2002/0023036 A1 | 2/2002 | Meder | |

FOREIGN PATENT DOCUMENTS

| | | | |
|---|---|---|---|
| JP | 11126327 | | 11/2000 |
| JP | 2000147070 | | 10/2001 |
| WO | WO 98/49642 | * | 4/1997 |

OTHER PUBLICATIONS www.databasesolutions.net excised from "The Wayback Machine" (web.archive.org) date Aug. 15, 2000.*
www.databasesolutions.net excised from "The Wayback Machine" (web.archive.org) date Aug. 15, 2000.*
"Homes.com releases PREP suite 4.0" Aug. 29, 2000. Press Release—Homes.com.*
"Homes.com to acquire PREP software" May 19, 2000. Press Release—Homes.com.*

(Continued)

*Primary Examiner*—Mark Fadok
(74) *Attorney, Agent, or Firm*—Smith & Hopen, P.A.; Anton J. Hopen

(57) ABSTRACT

A method of automating the communication of property value information including the steps of storing a property owner's record in a storage means, associating a sales entity with the property owner record, creating a property owner profile for the property owner record, establishing a connection to a property sales database, establishing a preselected search criteria based on the property owner profile, querying the property sales database for at least one sales transaction meeting the preselected search criteria, retrieving the sales transactions returned by the query, establishing a predetermined address associated with the property owner record, reporting at least one predetermined parameter of the sales transactions to the predetermined address, and establishing a management system to oversee and ensure that the property value information is published over a repeating and consistent block of time whereby the sales entity enhances its perceived knowledge, reputation and visibility by providing consistent and relevant sales transaction information to property owners who typically place a value on the receipt of recent property sales information in light of the fact that for most owners, the dollars invested in their property represents the single largest investment made in their lifetime.

4 Claims, 15 Drawing Sheets

OTHER PUBLICATIONS

Hlam, Alexander. Marketing for Dummiers. Foster City, CA. IDG Books Worldwide, 1997.*

Ring, Alfred A. Real Estate Principles and Practices. Englewood Cliffs, New Jersey. Prentice–Hall, Inc. 1972.* www.databasesolutions.net excised from "The Wayback Machine" (web.archive.org) date Aug. 15, 2000.*

"Homes.com releases PREP suite 4.0" Aug. 29, 2000. Press Release—Homes.com.*

"Homes.com to acquire PREP software" May 19, 2000. Press Release—Homes.com.*

* cited by examiner

AUTOMATED COMMUNICATION OF NEIGHBORHOOD PROPERTY VALUE INFORMATION FOR REAL ESTATE MARKETING

FIELD OF INVENTION

The present invention relates generally to a method of communicating property value information, and more particularly, to a method of communicating recent property sales transactions to an owner of similar property.

BACKGROUND OF THE INVENTION

Real estate marketing is a competitive industry. Agencies and individual sales agents go to great lengths to promote their services. It is not uncommon to see billboards, bus stops, brochures, television advertisement and the like campaigning for business. With this virtual flood of advertising, agencies are pressed to find new ways to establish relationships with new customers.

A productive, but not necessarily efficient, means of establishing customer relationships includes providing information specifically targeted at a potential customer based on the customer's personal information. For example, local sales information is typically available as a public record in the local tax collector's office. An industrious real estate agent might periodically cross-reference such records against an array of prospective customers and send them the results of the search. Providing this type of targeted information is generally well received by the prospective customer as relevant and of personal interest because for most customers, the personal dollars spent to purchase and maintain their home often represents the largest single investment in their lifetime. Even if the prospective customer is not in an immediate position for the real estate agent's services, goodwill and name recognition is achieved in the process that may be tapped at a later time. However, in order to properly research and prepare such correspondence, the real estate agent must expend considerable time and effort unrelated to showing property, closing deals and other important activities.

Because communication of recent property sales to owners in a neighborhood has traditionally represented an inefficient, but effective means of generating future leads and customer contacts, it is not an uncommon practice for this to be done by aggressive and hard-working real estate agents. However, it is also known in the industry that most real estate agents are not as aggressive in their prospecting work as they need to be to continually bring in a source of leads, and the agents that do make the time and dollar commitment to write, print, stuff, and mail periodic neighborhood property value letters do not continue after a time because they get too busy (with the leads that are generated from prior mailings) to keep it going.

What is needed is an automated method of searching, identifying and transmitting relevant property sales transactions to a prospective customer without the overhead of traditional methods. The use of computer networks, databases and document generation for the integration of such automated method is far from obvious.

Therefore, an object of this invention is to provide a method of automating the periodic communication of useful information to a potential real estate customer based on recent sales transactions.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing a novel method of automating the periodic communication of property value information without losing the ability to customize each property owner's report through the implementation of a real estate marketing system comprising the steps of storing at least one property owner record in a storage means, associating a sales entity with the at least one property owner record, creating a property owner profile for the at least one property owner record, establishing a connection to at least one property sales database, establishing a pre-selected search criteria based on the property owner profile, querying the least one property sales database for at least one sales transaction meeting the preselected search criteria, retrieving the at least one sales transaction returned by the query, establishing a predetermined address associated with the at least one property owner record, and reporting at least one predetermined parameter of the at least one sales transaction to the predetermined address whereby the sales entity enhances its perceived knowledge, reputation and visibility by providing relevant sales transaction information to a property owner. The at least one predetermined parameter may include, but is not limited to, the price at which the sale was made, the listing price, the date when the sales transaction occurred or the like. The at least one sales transaction may be limited to those in a predetermined geographic proximity to the predetermined address or to those of substantially similar value as an appraised value of the predetermined address.

However, if a sales entity has an office on the border between two areas (each area with their own property-listing database) the sales entity might list a single property in both property-listing databases. If this is the case, then duplicate entries may occur when both property-listing databases overlap. To resolve this problem, the present invention further comprises the steps of establishing a duplicate removal criteria, identifying at least one duplicate sales transactions retrieved from a plurality of overlapping property sales databases, and removing the at least one duplicate sales transaction. The step of establishing duplicate removal criteria may further comprise the step of matching at least one substantially similar table field value between the plurality of overlapping property sales databases. The at least one substantially similar table field value may be selected from the group consisting of listing date, contract date, sales date, listing price, sold price, subdivision, address, owner information, listing agent information, and property amenities.

A more complex issue arises when a common owner owns multiple properties. It would be inefficient to send the report of the at least one sales transactions to each property address that the common owner owns. Rather, it would be preferable that a single report go out encompassing relevant sales transactions for each individual property that the common owner owns. For example, a common owner might live in a metropolitan townhouse, but also own a beachfront cottage. That common owner might be interested in relevant sales transactions of other metropolitan townhouses similar to his or in his geographic area. In addition, the same common owner might also be interested in relevant sales transactions of other beachfront cottages.

To resolve this issue, the novel method comprises the steps of storing at least one property owner record in a storage means, creating a property owner profile for the at least one property owner record, associating a plurality of property owner records having a common owner where multiple properties owned in one neighborhood are "netted" out to enable the automated communication to focus on providing information on "different" neighborhoods where property is owned, associating a sales entity with the common owner, establishing a connection to at least one property sales database, establishing a preselected search criteria based on the property owner profile, querying the at least one property sales database for at least one sales transaction meeting the preselected search criteria, retrieving the at least one sales transaction returned by the query, grouping the at least one sales transaction according to the common owner, and reporting the at least one sales transaction across multiple properties owned in different neighborhoods to a predetermined address associated with the common owner.

The step of associating the plurality of property owner records having a common owner may further comprise the steps of establishing a substantially distinct identifier for the common owner, querying the at least one property record database for the substantially distinct identifier, retrieving the plurality of property records listed under the substantially distinct identifier, associating a single predetermined address with the common owner, and reporting the at least one sales transaction to the single predetermined address selected from the plurality of property records listed under the substantially distinct identifier. A more precise substantially distinct identifier may be obtained by the steps of accessing a tax bill mailing address, retrieving a common owner's name from the tax bill mailing address, retrieving a common owner's address from the tax bill mailing address, and forming a preselected combination of the common owner's name and the common owner's address to form the substantially distinct identifier.

The step of forming the preselected combination may further comprise parsing the tax bill mailing address for the first character of the street address, the first character of the first name, the entire last name and the first five characters of the postal code. The reason for this methodology is that human data entry can sometimes result in varying results. For example, if the mailing address is "Post Office Box 555," a data entry operator might enter "PO Box 555," "P.O. Box 555," or "POB 555." All of those entries would be correct in substance, but have different string values for the purpose of database searching. Likewise, the first name of "Donald" might also be represented as "Don" or "Donny." However, a data entry operator will unlikely come up with variations of a last name such as "Jones" or "Smith." Therefore, the entire last name is generally a reliable identifier. Finally, postal codes or zip codes, generally start with five digits, but may also include extra integers to more precisely define the area. However, the extra integers are often omitted and therefore are best left unread for consistency.

An alternative embodiment of the invention includes the steps of first establishing a predetermined geographic area containing prospective real estate clients. This predetermined geographic area might be a condominium, subdivision or the like. A single sales entity is assigned to the predetermined geographic area. This prevents multiple agents from overlapping their sales efforts. A list of property owners within the predetermined geographic area is assembled from public record databases, typically county tax records. In a preferred embodiment, the single sales entity reviews the list of property owners to remove an array of non-preferred clients from the list. Non-preferred client would include other, competitive real estate agents, developers and like. A property sales database is accessed which might comprise a multiple listing service or a public tax-roll database. A first array of sales records is retrieved from the database covering transactions occurred in the predetermined geographic area. This first array of sales records may include, property sales occurred in the condominium, subdivision or other geographic area designated as the predetermined geographic area. This first array is particularly relevant to the property owners with the predetermined geographic area as it provides a measure of the value of their own property. A second array of comparable sales records outside the redetermined geographic area may also be obtained. These comparable sales records are also useful to the property owners to contrast the relative value and frequency of sales in neighboring geographic areas.

At least one or more individual records from the first array of sales records may be tagged as a preferred purchase or "best buy." A string field description is entered providing a basis for selecting the preferred purchased. Examples of preferred purchase strings may include, "open floor plan and very spacious," "lake & golf course view," "close to the beach," or "great price for Bonita Bay." The individual document template is then populated with the string field description.

An additional step of the invention also includes establishing a selectable column field for the report. For example, in a certain area, boating canals may run through many neighborhoods, but on an every other street basis. Homes backing up to a canal with boat dock access typically sell for substantially more than homes across the street from them that are landlocked. Therefore, it would be desirous for a sales entity to designate "waterfront" or "water access" for the special column so that recipients of the report can understand why some homes sell for more than other comparable homes in the same neighborhood.

In an alternative embodiment of the invention, an additional step may include a Boolean operator determinative of whether vacant lot information is excluded or included in the report.

The method may also integrate with a docketing or contact management system wherein the individual property owner receiving a report is marked for a follow up telephone call after a predetermined time period subsequent to the transmission of the report. And if the assigned agent does not have the time to make a follow-up phone call, the call may be made by a telemarketing center of licensed real estate agents working for the company providing the automated property value communication. Any leads generated from these calls can also be recorded in the contact management system for later review and follow-up.

Accordingly, it is an object of this invention to provide a method of consistently and efficiently communicating unduplicated property value information relating to recent or pending sales transactions to property owners identified as prospective customers by a sales agent using a customizable report format.

Another object of this invention is to provide a method of identifying multiple properties owned by an individual property owner and communicating a single report encompassing the different multiple properties owned by the individual owner.

Another object of this invention is to provide a method of assigning target neighborhoods to sales agents to prevent an overlap of communication and to give agents a reason to spend their time and resources to consistently communicate property value information to property owners over a long and extended timeframe.

An advantage of the invention is that property owners receive consistent valuable customized information illustrating the relative value of their own property based on recent and pending sales transactions occurring in their neighborhood as well as other similar neighborhoods in the surrounding area. Research done among owners receiving the communications to-date has shown that 9 out of 10 want to continue receiving the communication.

Another advantage of the invention is that real estate agents and agencies utilize less time organizing property transaction data to create reports, and therefore may spend their time on more profitable tasks.

Another advantage of the invention is that it gives many agents the ability to send out a valuable, customized property report on a consistent basis who otherwise would not have "gone to the trouble" of periodically gathering the information, writing the document, and disseminating the communication on their own.

Another advantage of the invention is that it gives back control over the prospecting of customers to real estate agency owners. Many agents would not take the initiative on their own to consistently prospect themselves to a large base of potential customers (not surprisingly, most agents are not "go-getters"—in the real estate industry it is commonly known that 80% of the business is done by 20% of the sales force). However, with this invention, agency business owners now have a valuable prospecting and marketing tool that they can offer agents (or require them to use) that takes little effort on the agent's part to implement, but has a proven track record to produce leads because it offers prospective customers a consistently delivered free customized report showing changes in property values in their neighborhood as well as similar surrounding neighborhoods.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
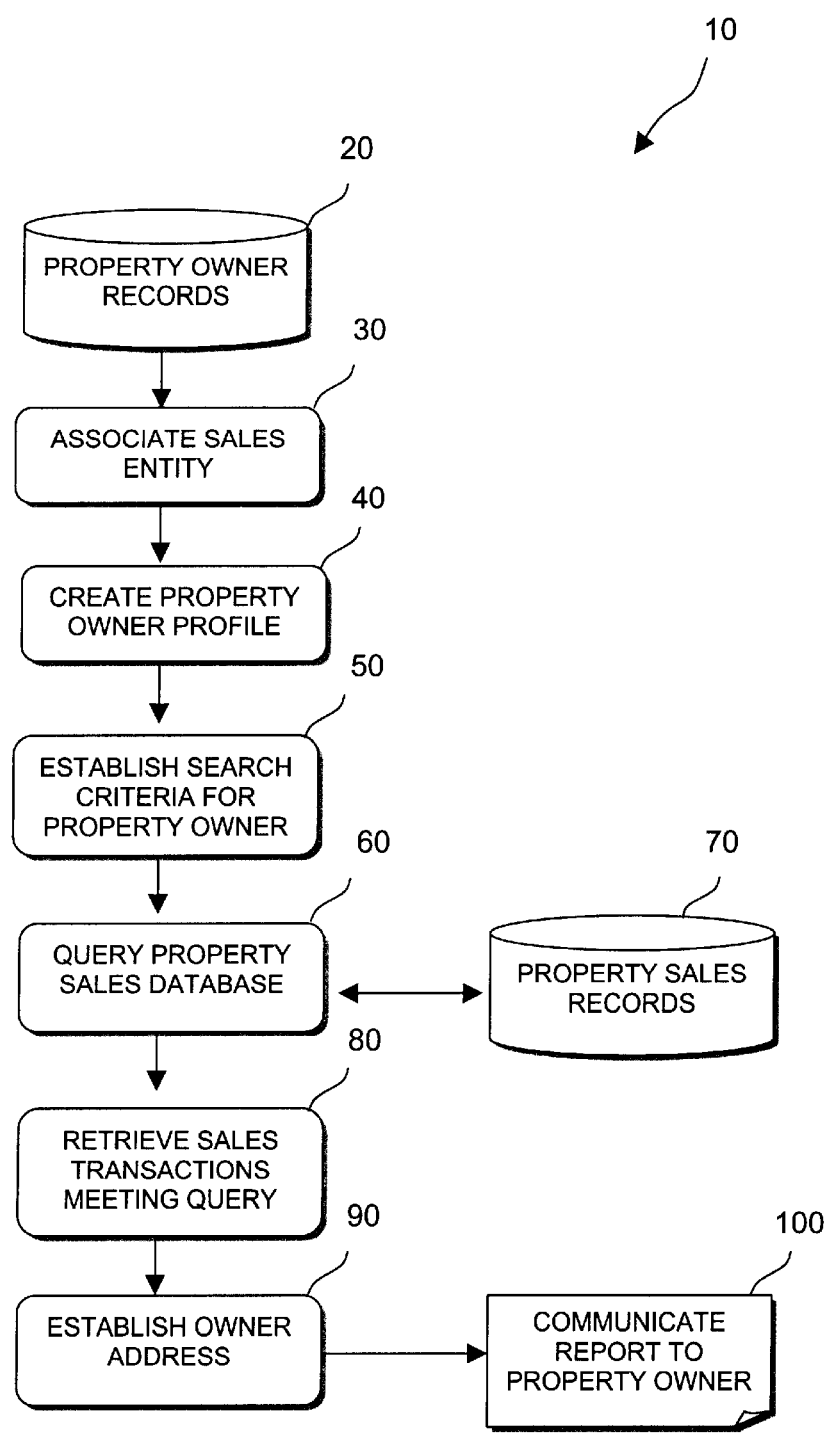
FIG. 1 is a functional block diagram of the method of communicating property value information according to the invention.
Figure 2:
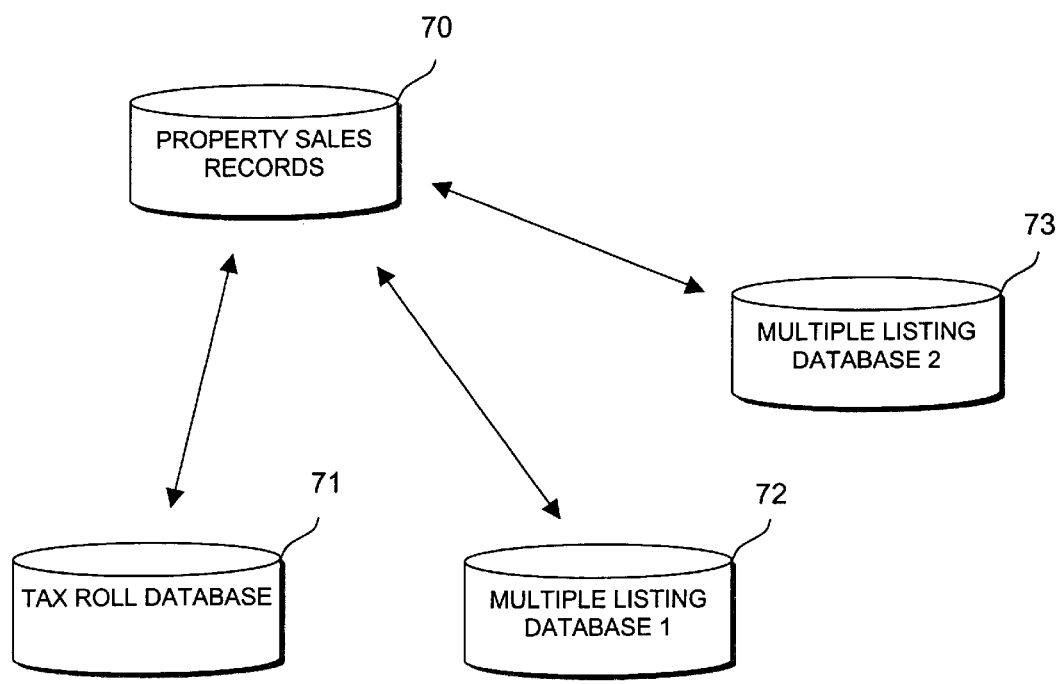
FIG. 2 is a functional block diagram of multiple property databases forming the property sales record database described in the invention.
Figure 3:
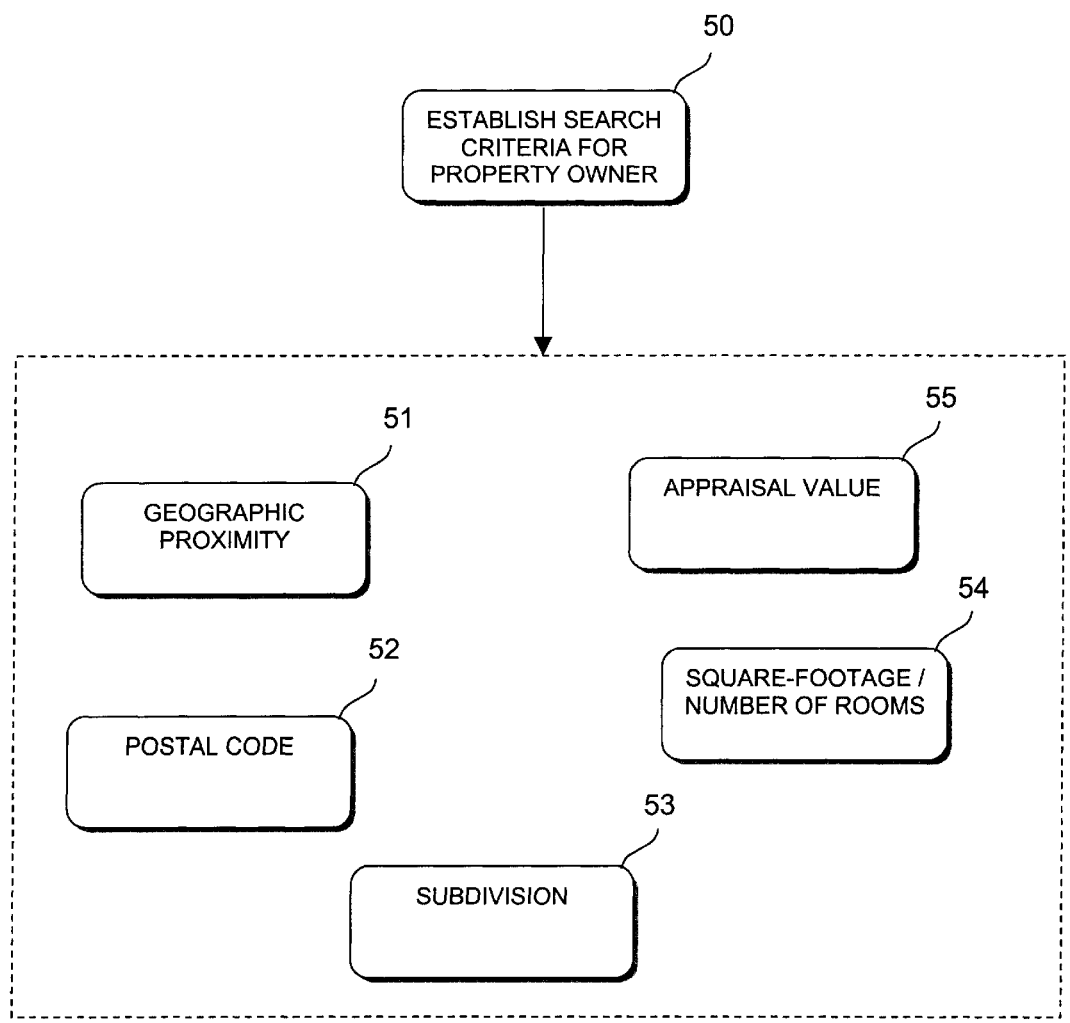
FIG. 3 is a functional block diagram of an illustrative array of search criteria elements that may be combined to establish a search criteria for the property owner.

Referring initially to FIG. 1, it will there be seen that a first embodiment of the present invention is denoted as a whole by the reference number 10. The invention comprises the steps of storing at least one property owner record in a storage means 20, associating a sales entity with the at least one property owner record 30, creating a property owner profile for the at least one property owner record 40, establishing a connection to at least one property sales database 70, establishing a preselected search criteria based on the property owner profile 50, querying the at least one property sales database 60 for at least, one sales transaction meeting the preselected search criteria, retrieving the at least one sales transaction returned by the query 80, establishing a predetermined address 90, associated with the at least one property owner record, and reporting at least one predetermined parameter of the at least one sales transaction to the predetermined address 100 whereby the sales entity enhances its perceived knowledge, reputation and visibility by providing relevant sales transaction information to a property owner. In FIG. 2, the property sales database 70 may actually comprise a plurality of databases such as a tax roll database 71, and multiple listing databases 72 and 73 which may overlap in territory. In FIG. 3, the preselected search criteria based on the property owner profile 50 may be generated of any combination of factors such as geographic proximity 51, postal code 52, subdivision identity 53, the dimensions and number of rooms of the houses 54, and the appraisal value 55 of the houses. When establishing the search criteria 50, it is important to anticipate the type of information most desired by the prospective real estate customer.

Figure 4:
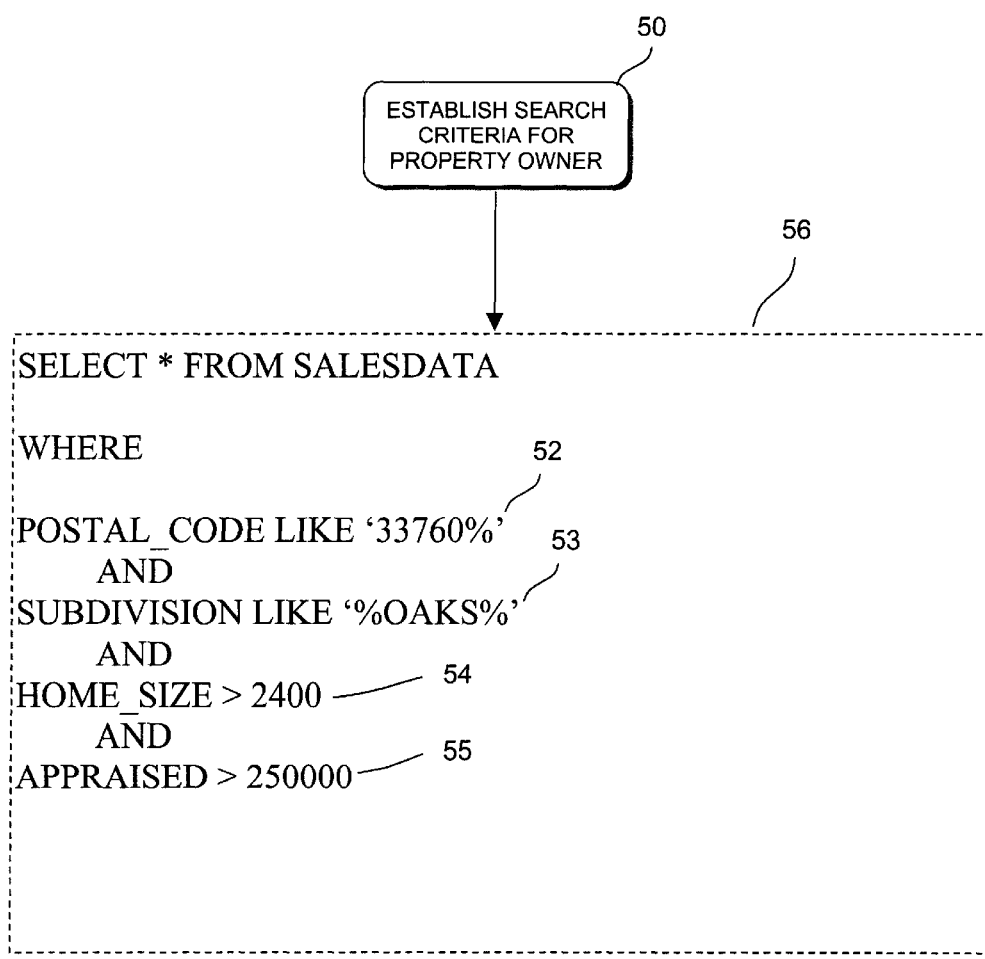
FIG. 4 is a functional block diagram showing an illustrative example of SQL syntax to execute the search query.

FIG. 4 illustrates an example of the search criteria 50 based on standardized Search Query Language (SQL) syntax 56. The initial statement SELECTS all the records from a database named SALESDATA with a number of conditions. The first condition 52 requires that any property included in the search have a postal code with the first five integers of "33760." By including the "%" sign after the first five integers, properties that further specify an additional four-digit postal code suffix will also be selected. The second condition 53 requires that any property be located in a subdivision that contains the word "OAKS" anywhere in the database field. By including the "%" sign before and after "OAKS," variances in the database field for the subdivision name do not negatively affect the search results. For example, the second condition 53 would return properties listed in "THE OAKS," "OAKS,THE," and simply "OAKS." The third condition 54 requires that any property returned in the search be greater than 2,400 square feet in area and the fourth condition 55 requires that the appraised value of any property returned in the search be greater than $250,000. Of course, SQL syntax is well known in the art and a large number of permutations are available for specifying the types of properties to be returned in the search.

Figure 5:
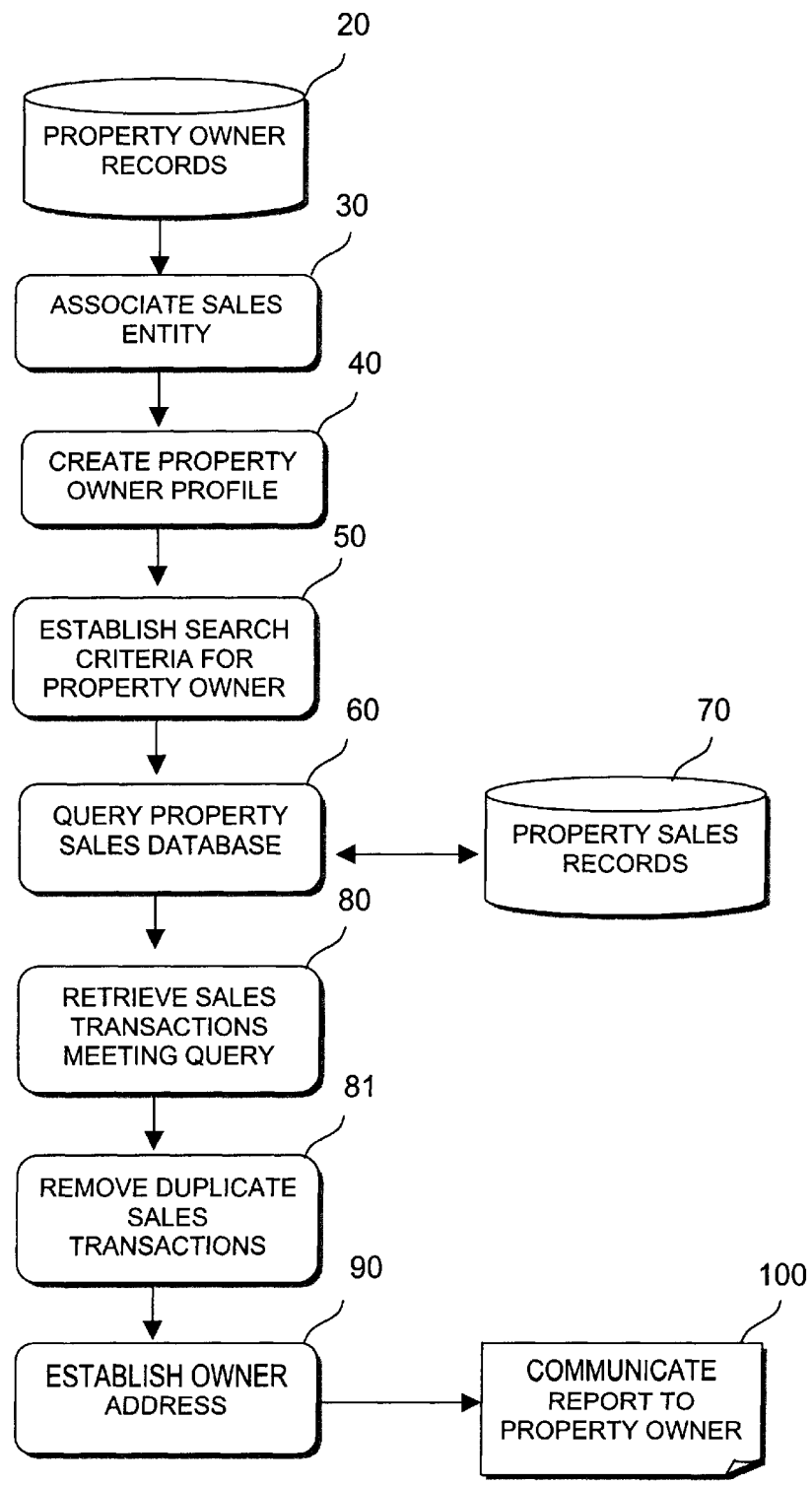
FIG. 5 is a functional block diagram including the step of removing duplicate sales transactions from the sales transaction retrieved from the database query.
Figure 6:
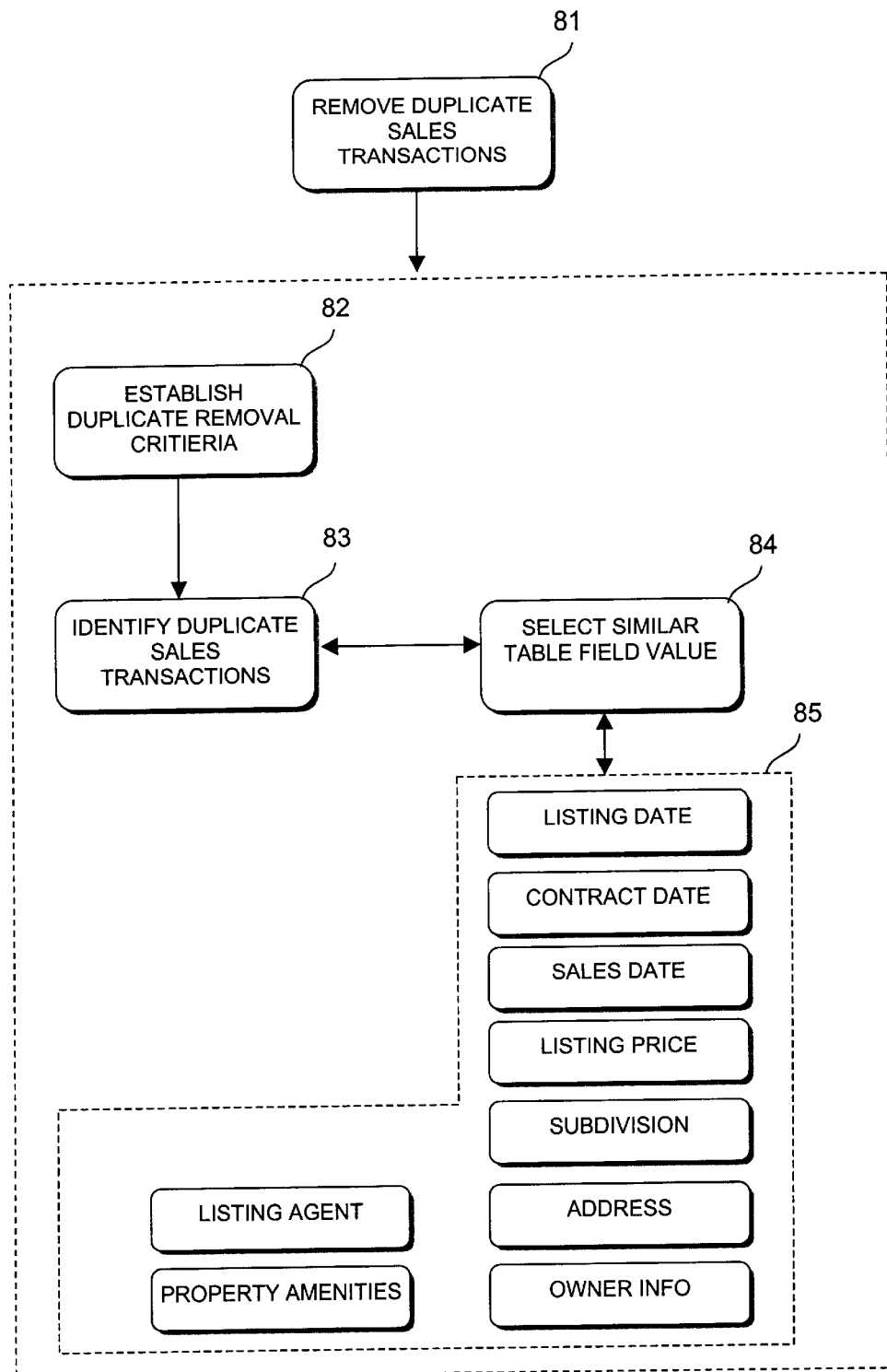
FIG. 6 is a detailed function block diagram of a preferred method of removing duplicate sales transactions.

If a sales entity has an office on the border between two areas (each area with their own property-listing database) the sales entity might list a single property in both property-listing databases. If this is the case, then duplicate entries may occur when both property-listing databases overlap. To resolve this problem, the present invention further comprises the steps of establishing a duplicate removal criteria 82, identifying at least one duplicate sales transactions retrieved from a plurality of overlapping property sales databases 83, and removing the at least one duplicate sales transaction 81 (FIG. 5-6). As shown in FIG. 6, the step of establishing duplicate removal criteria 82 may further comprise the step of matching at least one substantially similar table field value 84 between the plurality of overlapping property sales databases. The at least one substantially similar table field value may be selected from the group 85 consisting of listing date, contract date, sales date, listing price, sold price, subdivision, address, owner information, listing agent information, and property amenities.

Figure 7:
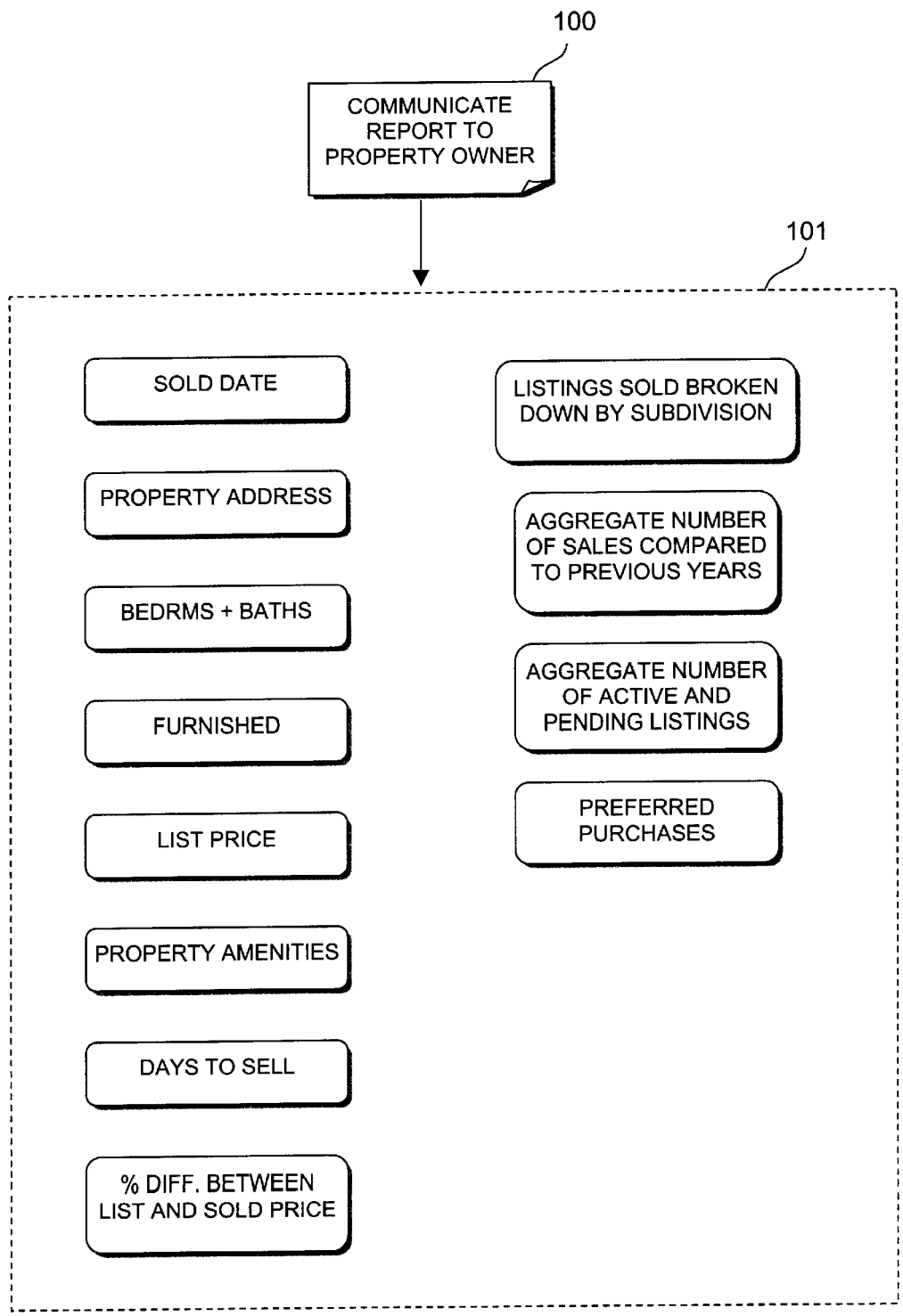
FIG. 7 shows an array of database field results to include in a report to the property owner.

FIG. 7 illustrates an array of exemplary information 101 which may be included in the step of reporting at least one predetermined parameter of the sales transactions to the predetermined address 100. Such information may include sold date, property address, number of rooms, whether the property is furnished, list price, property amenities, days the property took to sell, the percentage difference between the list price and the sold price, the listing sold grouped by subdivision, the aggregate number of sales compared to previous years, the aggregate number of active and pending listing and preferred purchases determined by the sales entity.

Figure 8:
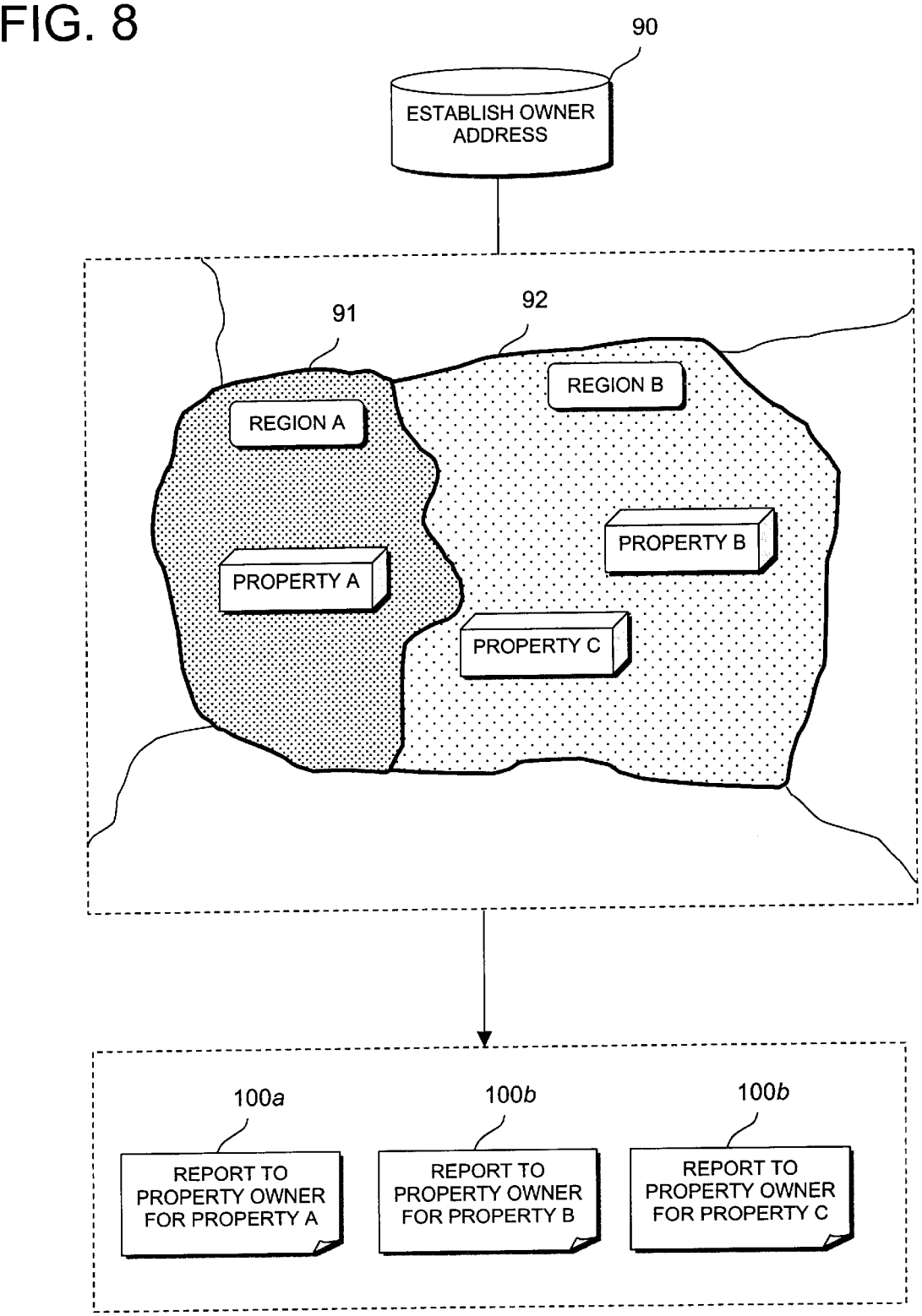
FIG. 8 is a functional block diagram of a property owner with title to multiple properties in two different regions resulting in three reports being generated for the individual property owner.

A more complex issue arises when a common owner owns multiple properties. As shown in FIG. 8, a common owner 90 owns Property A in Region A 91 and also owns Properties B and C in Region 92. Without recognizing that a common owner exists for Properties A–C, three separate reports 100a–c will be mailed to the same property owner. It would be inefficient to send the report of the at least one sales transactions to each property address that the common owner owns. Rather, it would be preferable that a single report go out encompassing relevant sales transactions for each individual property that the common owner owns. Furthermore, a first sales entity might represent the properties in Region A while a second sales entity might represent the properties in Region B. It is undesirable for the first and second sales agents to compete for the same property owner's real estate business.

Figure 9:
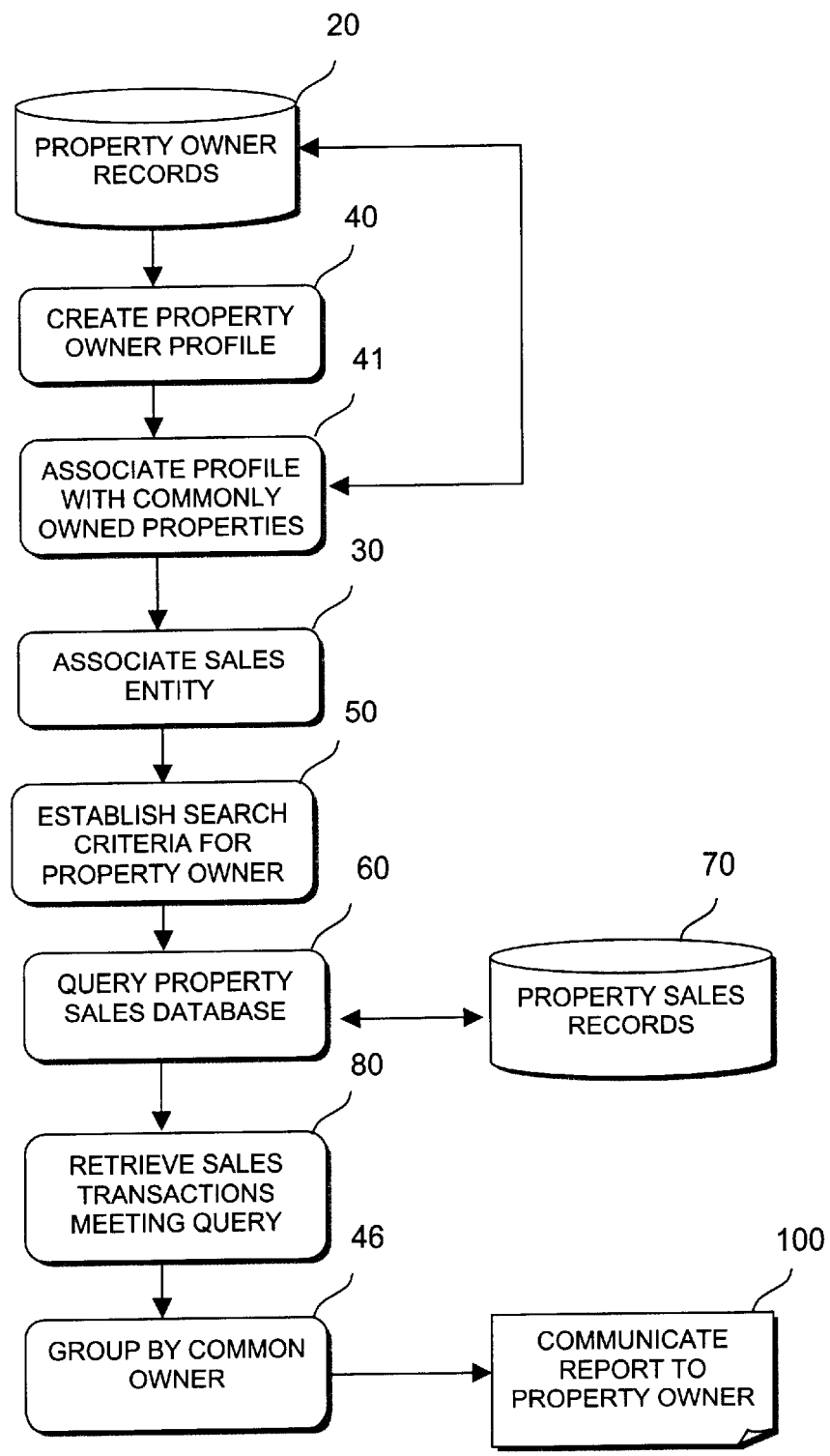
FIG. 9 is a functional block diagram showing the additional step of associating a property owner profile with commonly owned properties by that owner.

To resolve this issue, the novel method as shown in FIG. 9 comprises the steps of storing at least one property owner record in a storage means 20, creating a property owner profile for the at least one property owner record 40, associating a plurality of property owner records having a common owner 41, associating a sales entity with the common owner 30, establishing a connection to at least one property sales database 70, establishing a preselected search criteria based on the property owner profile 50, querying 60 the at least one property sales database 70 for at least one sales transaction meeting the preselected search criteria 50, retrieving the at least one sales transaction returned by the query 80, grouping the at least one sales transaction according to the common owner 46, and reporting the at least one sales transaction to a predetermined address associated with the common owner 100.

Figure 10:
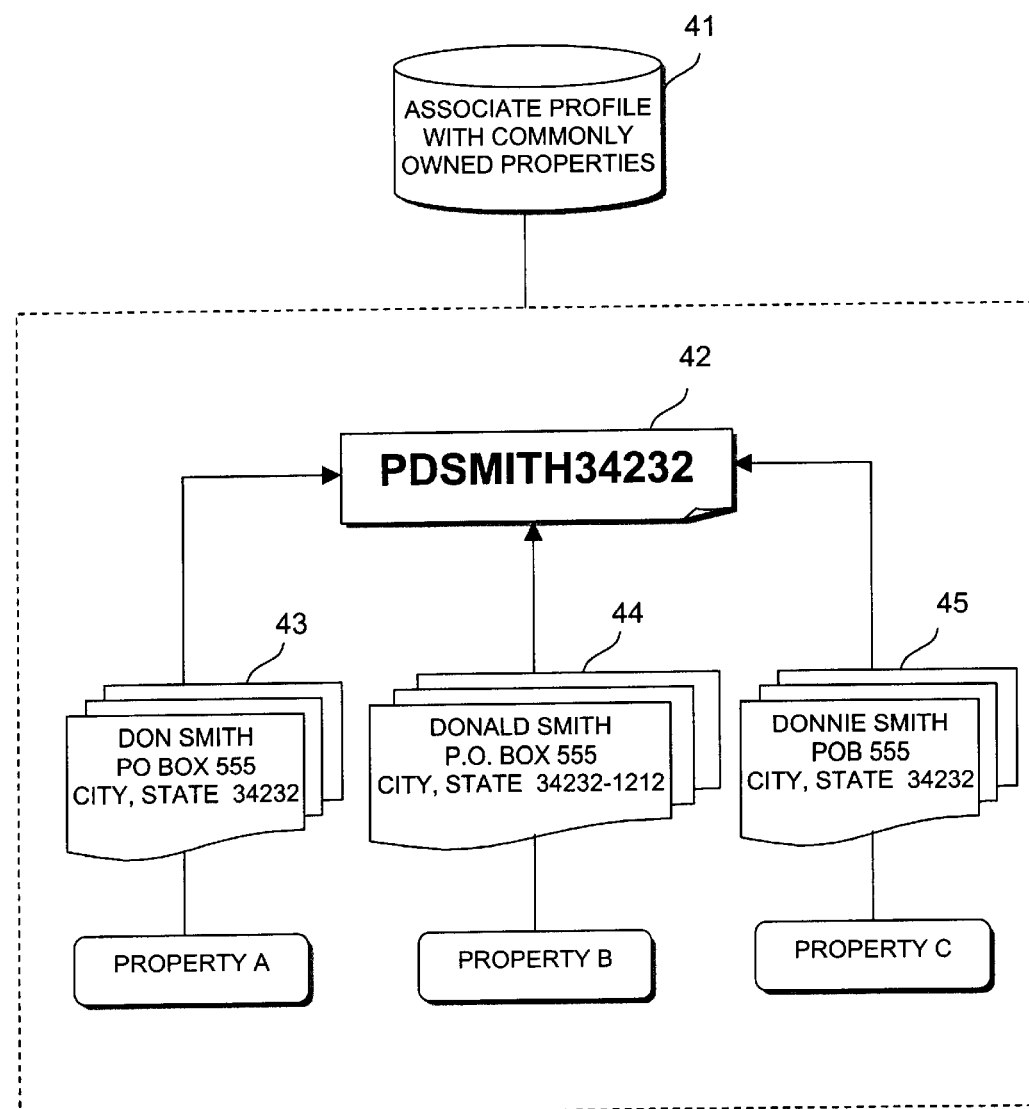
FIG. 10 is a functional block diagram of the method of identifying a common property owner for multiple properties based on tax roll data, even if the data is entered inconsistently.

As shown in FIG. 9-10, the step of associating the plurality of property owner records having a common owner may further comprise the steps of establishing a substantially distinct identifier 93 for the common owner, querying the at least one property record database 70 for the substantially distinct identifier 93, retrieving the plurality of property records listed under the substantially distinct identifier 80, associating a single predetermined address with the common owner 46, and reporting the at least one sales transaction to the single predetermined address selected from the plurality of property records listed 100 under the substantially distinct identifier 93. A more precise substantially distinct identifier 93 may be obtained by the steps of accessing a tax bill mailing address, retrieving a common owner's name from the tax bill mailing address, retrieving a common owner's address from the tax bill mailing address, and forming a preselected combination of the common owner's name and the common owner's address to form the substantially distinct identifier 93.

FIG. 10 shows the step of forming the preselected combination by parsing the tax bill mailing address for the first character of the street address, the first character of the first name, the entire last name and the first five characters of the postal code 42. The reason for this methodology is that human data entry can sometimes result in varying results. For example, if the mailing address is "Post Office Box 555," a data entry operator might enter "PO Box 555," 43 "P.O. Box 555," 44 or "POB 555" 45. All of those entries would be correct in substance, but have different string values for the purpose of database searching. Likewise, the first name of "Donald" 44 might also be represented as "Don" 43 or "Donnie" 45. However, a data entry operator will unlikely come up with variations of a last name such as "Jones" or "Smith." Therefore, the entire last name is generally a reliable identifier. Finally, postal codes or zip codes, generally start with five digits, but may also include extra integers to more precisely define the area. However, the extra integers are often omitted and therefore are best left unread for consistency.

Figure 11:
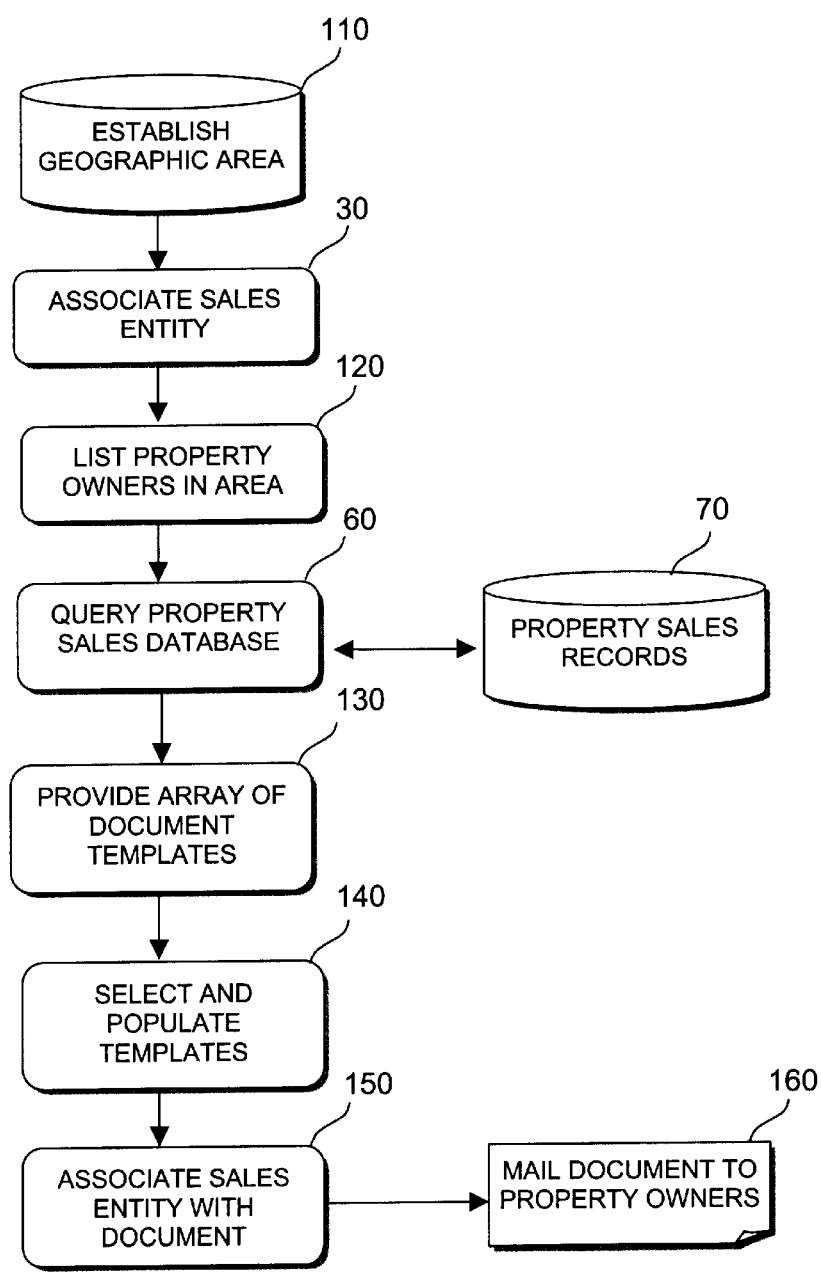
FIG. 11 is a functional block diagram of the method of generating report documents to property owners based on populating previously created templates and populating them with property sales data.
Figure 12:
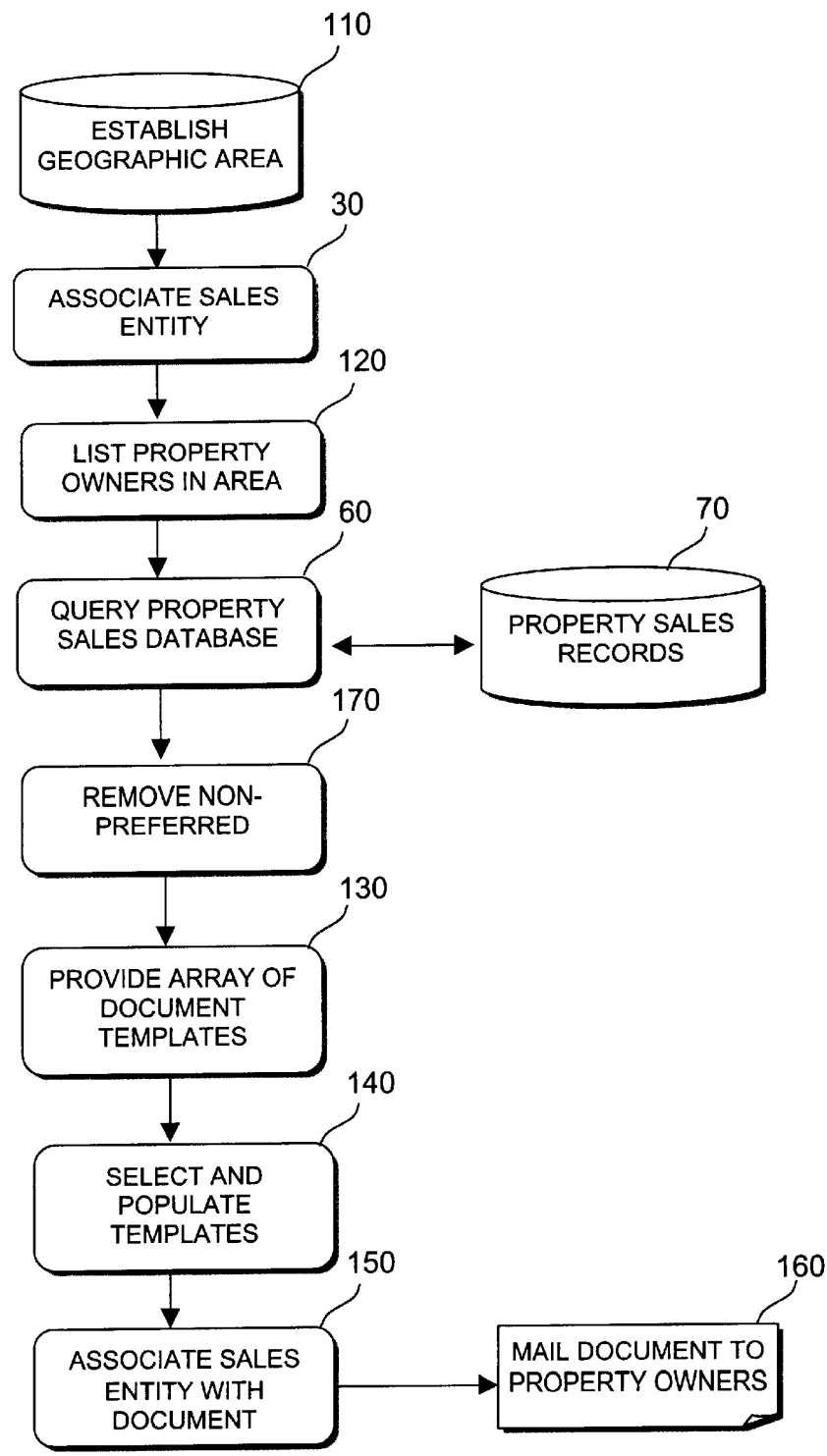
FIG. 12 is a functional block diagram of the invention further showing the step of removing non-preferred property owners.

FIGS. 11 and 12 show an alternative embodiment of the invention including the steps of first establishing a predetermined geographic area 110 containing prospective real estate clients. This predetermined geographic area might be a condominium, subdivision or the like. A single sales entity is assigned to the predetermined geographic area 30. This prevents multiple agents from overlapping their sales efforts. A list of property owners within the predetermined geographic area is assembled 120 from public record databases, typically county tax records. In a preferred embodiment, the single sales entity reviews the list of property owners to remove an array of non-preferred clients from the list 170. Non-preferred client would include other, competitive real estate agents, developers and like.

An array of document templates 130 is provided to the sales entity. While the sales entity may type own their own letter, choosing from the array of document templates 130 saves time and effort.

Figure 13:
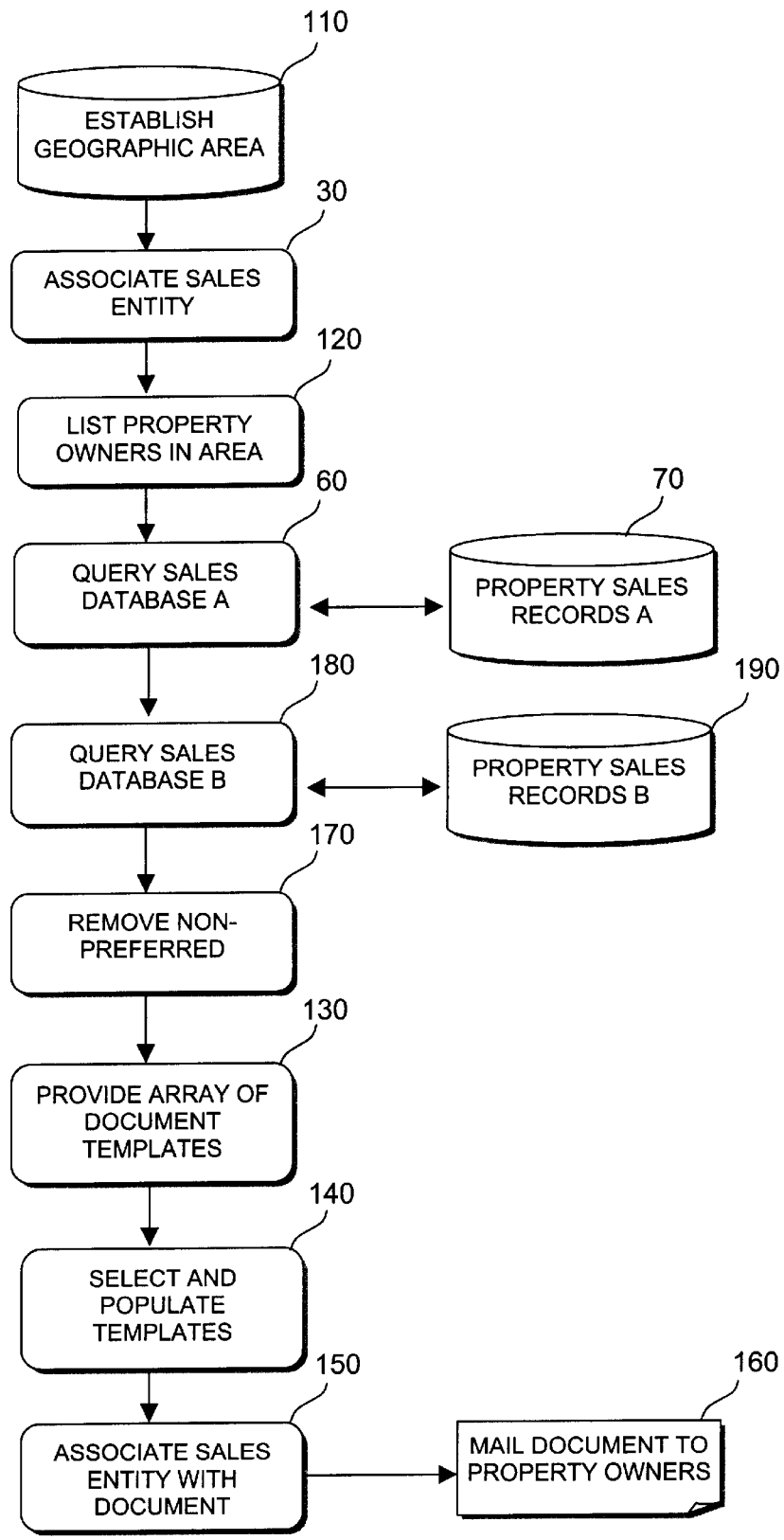
FIG. 13 is a functional block diagram of the invention further showing the step of retrieving comparable sales records outside a predetermined geographic area.

A property sales database 70 is accessed which might comprise a multiple listing service or a public tax-roll database. In an alternative embodiment illustrated in FIG. 13, a first array of sales records is retrieved from the database covering transactions occurred in the predetermined geographic area 60. This first array of sales records may include, property sales occurred in the condominium, subdivision or other geographic area designated as the predetermined geographic area. This first array is particularly relevant to the property owners with the predetermined geographic area as it provides a measure of the value of their own property. A second array of comparable sales records outside the predetermined geographic area 180 may also be obtained. These comparable sales records are also useful to the property owners to contrast the relative value and frequency of sales in neighboring geographic areas.

Figure 14:
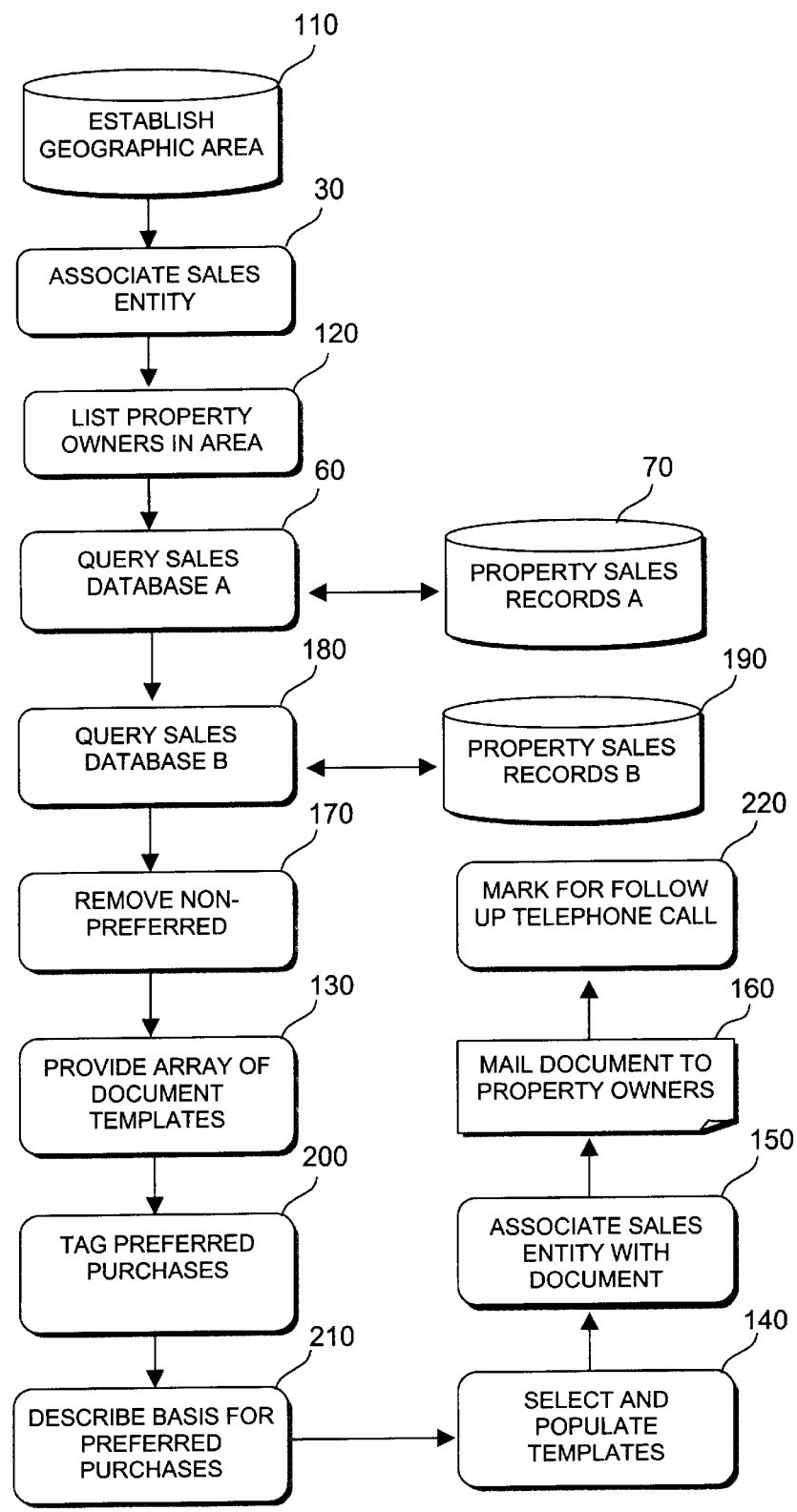
FIG. 14 is a functional block diagram of the invention further showing the steps of tagging certain properties as preferred purchases and marking records for follow up telephone calls.

In FIG. 14 at least one or more individual records from the first array of sales records may be tagged as a preferred purchase 200 or "best buy." A string field description is entered 210 providing a basis for selecting the preferred purchased. Examples of preferred purchase strings may include, "open floor plan and very spacious," "lake & golf course view," "close to the beach," or "great price for Bonita Bay." The individual document template is then populated with the string field description 140.

The method may also integrate with a docketing or contact management system wherein the individual property owner receiving a report is marked for a follow up telephone call 220 after a predetermined time period subsequent to the transmission of the report. It is also preferred that the property owner telephone number be cross-referenced against a list of no-call numbers for regulatory compliance.

Figure 15:
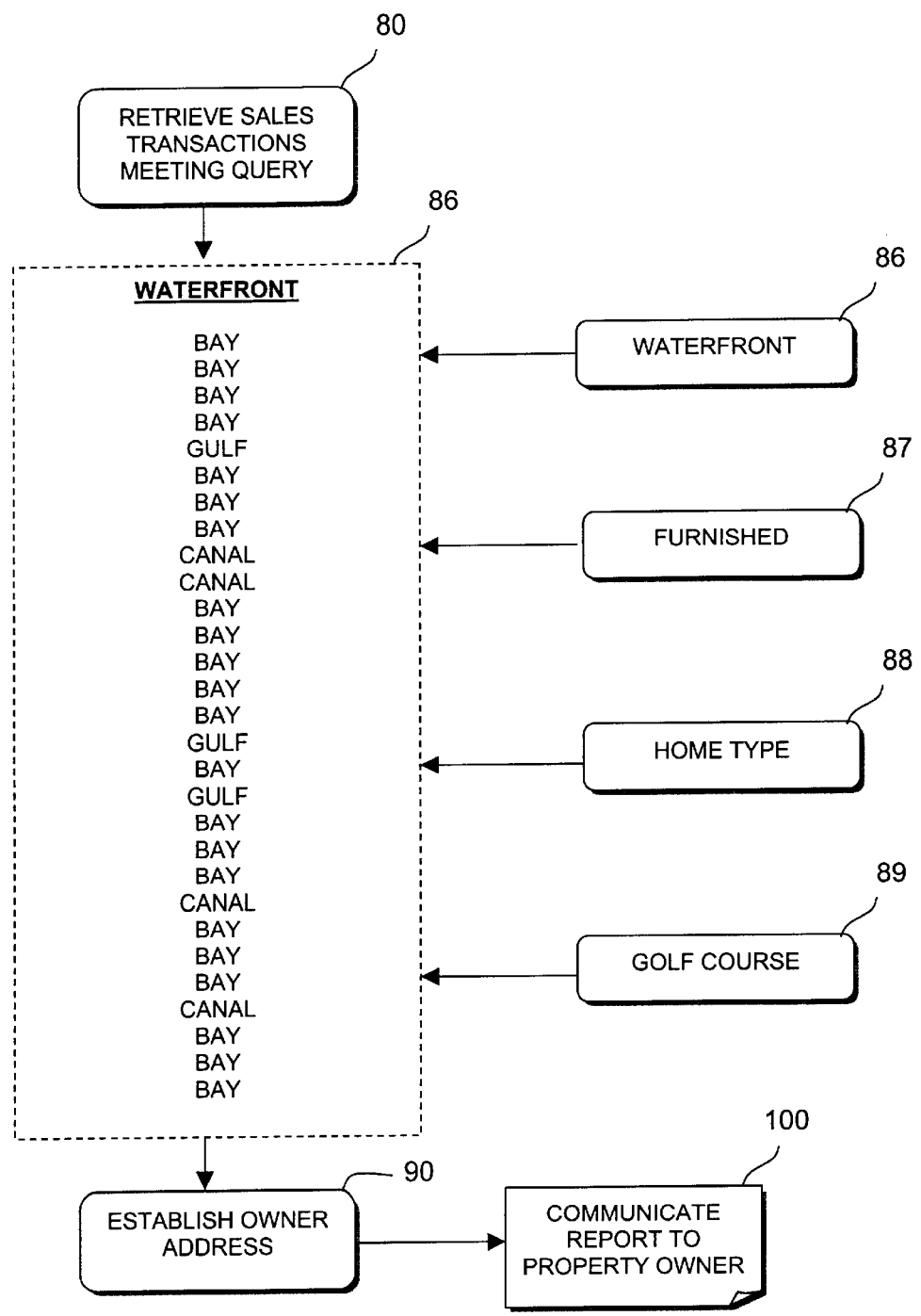
FIG. 15 is a functional block diagram of the invention further showing the steps of establishing a selectable column field for reporting.

In FIG. 15, a selectable column field 86 is provided to help compare otherwise similar properties. Because there is a limited amount of space on any screen display or piece of paper, the sales entity will appreciate the freedom to include particularly relevant information when comparing properties. For many properties, waterfront access is highly determinative of the value of the property. Accordingly, the sales entity might include waterfront data 86 in the report. For other types of property, furnishings 87, home type 88, or a golf course view 89 might be more relevant to prospective customer.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of communicating property value information comprising the steps of:

storing at least one property owner record in a storage means;

creating a property owner profile for said at least one property owner record;

associating a plurality of property owner records having a common owner;

associating a sales entity with said common owner;

establishing a connection to at least one property sales database;

establishing a preselected search criteria based on said property owner profile;

querying said at least one property sales database for at least one sales transaction meeting said preselected search criteria;

retrieving said at least one sales transaction returned by said query;

grouping said at least one sales transaction according to said common owner;

reporting said at least one sales transaction to a predetermined address associated with said common owner.

2. The method of claim 1 wherein the step of associating said plurality of property owner records having a common owner further comprises:

establishing a substantially distinct identifier for said common owner;

querying said at least one property record database for said substantially distinct identifier;

retrieving said plurality of property records listed under said substantially distinct identifier;

associating a single predetermined address with said common owner;

reporting said at least one sales transaction to said single predetermined address selected from said plurality of property records listed under said substantially distinct identifier.

3. The method of claim 2 further comprising the steps of:

accessing a tax bill mailing address;

retrieving a common owner's name from said tax bill mailing address;

retrieving a common owner's address from said tax bill mailing address;

forming a preselected combination of said common owner's name and said common owner's address to form said substantially distinct identifier.

4. The method of claim 3 wherein the step of forming said preselected combination further comprises parsing said tax bill mailing address for the first character of the street address, the first character of the first name, the entire last name and the first five characters of the postal code.

* * * * *